United States Patent
Yoshizawa

(10) Patent No.: US 7,522,357 B2
(45) Date of Patent: Apr. 21, 2009

(54) TILT ADJUSTMENT DEVICE FOR OBJECTIVE LENSES AND METHOD OF ADJUSTING TILT OF OBJECTIVE LENSES

(75) Inventor: Akiho Yoshizawa, Higashihiroshima (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 11/972,472

(22) Filed: Jan. 10, 2008

(65) Prior Publication Data
US 2008/0170304 A1    Jul. 17, 2008

(30) Foreign Application Priority Data
Jan. 15, 2007   (JP)   ............... 2007-005809
Dec. 21, 2007   (JP)   ............... 2007-330128

(51) Int. Cl.
*G02B 7/02*   (2006.01)
(52) U.S. Cl. ................ 359/811; 359/813; 359/819
(58) Field of Classification Search ......... 359/811, 359/813, 819
See application file for complete search history.

(56) References Cited

U.S. PATENT DOCUMENTS

2005/0276207 A1*  12/2005  Oka et al. ............. 369/112.23
2008/0095020 A1*   4/2008  Takahashi et al. ...... 369/112.24

FOREIGN PATENT DOCUMENTS

| JP | 2005-174485 |   | 6/2005 |
| JP | 2005-174485 | A | 6/2005 |
| JP | 2006-19001  |   | 1/2006 |

* cited by examiner

Primary Examiner—Jordan M. Schwartz
Assistant Examiner—James C Jones
(74) Attorney, Agent, or Firm—Morrison & Foerster LLP

(57) ABSTRACT

A tilt adjustment device K for objective lenses which comprises: a positioning stand 52 for supporting a holder 3 which fixedly holds a first objective lens 1; at least three pins 57a, 57b, and 57c for supporting an inferior surface of an edge of a second objective lens 2 by each tip of the pins; a pin fixedly supporting member 57 for fixedly supporting the ends of the pins; tilt adjusting means for tilting the pin fixedly supporting member 57 so that the second objective lens 2 is tilt-adjusted around a principal point center with respect to an inferior surface of an edge of the first objective lens 1; and a press member 54 for pressing a superior surface of the second objective lens 2, which can be removed after the second objective lens 2 is fixed.

13 Claims, 5 Drawing Sheets

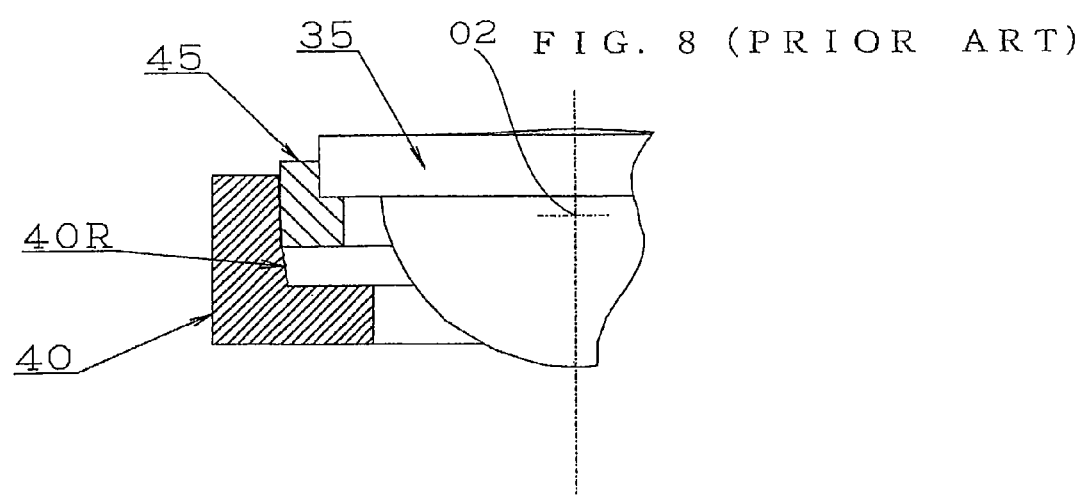

TILT ADJUSTMENT DEVICE FOR OBJECTIVE LENSES AND METHOD OF ADJUSTING TILT OF OBJECTIVE LENSES

CROSS-REFERENCES TO RELATED APPLICATIONS

This application is related to Japanese Patent Applications Nos. 2007-5809 and 2007-330128, filed on Jan. 15, 2007 and Dec. 21, 2007, whose priorities are claimed under 35 USC §119, the disclosures of which are incorporated by reference in their entirety.

BACKGROUND OF THE INVENTION

1. Field of the Invention

The present invention relates to a tilt adjustment device for objective lenses and a method of adjusting tilt of the objective lenses. More particularly, the present invention relates to a tilt adjustment device for objective lenses which are to be provided in an optical pickup device which converges a laser beam emitted from a laser element to irradiate an information recording medium with the converged laser beam, receives a reflected light from the information recording medium, and reproduces and/or records information, and to a method of adjusting tilt of the objective lenses.

2. Description of the Related Art

An optical pickup device of this kind is usually provided with an actuator having a plurality of objective lenses for converging a laser beam and irradiating an information recording medium with the converged laser beam, and a holder for holding the objective lenses so that each of the objective lenses can be adjusted at a predetermined tilt.

As shown in FIG. 7, a structure of adjusting tilt of one objective lens can adjust tilt of an objective lens 30 around a principal point center O1 of the objective lens 30. Specifically, the principal point center O1 of the objective lens 30 is positioned upper than an inferior surface of an edge of the objective lens 30 (a flat area at the rim of the lens), and an outermost part of the inferior surface of the edge is in contact with an objective lens holder 40. Therefore, only by inclining the objective lens holder 40, the tilt can be adjusted so that a laser beam is converged and emitted to an information recording medium. The reference numeral 40R denotes a circular arc surface of the objective lens holder 40.

On the other hand, in another structure of adjusting tilt of an objective lens, as shown in FIG. 8, a principal point center O2 of an objective lens 35 is lower than an inferior surface of an edge of the objective lens 35. Consequently, even when an outermost part of the inferior surface of the edge of the objective lens 35 is made in contact with the objective lens holder 40 like the objective lens 30 of FIG. 7, the tilt cannot be adjusted to converge a laser beam and to emit the converged laser beam to the information recording medium.

In this case, an objective lens spacer 45 is fixed to the objective lens 35 by an adhesive or the like so that the principal point center O2 of the objective lens 35 can be positioned upper than an inferior surface of the objective lens spacer 45. The objective lens spacer 45 and the objective lens 35 have to be assembled in the objective lens holder 40 in order to adjust the tilt of the objective lens 35 (see Japanese Unexamined Patent Application Publication Nos. 2005-174485 and 2006-19001).

However, the structures of adjusting the tilts of those objective lenses are complicated, and the number of man-hours also increases.

As described above, in conventional methods of adjusting tilt around a principal point center of an objective lens, an assembly process has to be changed according to whether the principal point center (or simply principal point) is upper or lower than an inferior surface of an edge of the objective lens.

SUMMARY OF THE INVENTION

An object of the present invention is to enable tilt of objective lenses to be easily adjusted without changing a holding process (assembly process) of the objective lenses regardless of whether a position of a principal point center of each objective lens is upper or lower than an inferior surface of an edge of the objective lens.

The present invention provides a tilt adjustment device for objective lenses which are to be provided in an optical pickup device for converging a laser beam emitted from a laser element, irradiating an information recording medium with the converged beam, receiving a reflected light from the information recording medium, and reproducing and/or recording information, the optical pickup device being provided with an actuator comprising a plurality of the objective lenses for converging the laser beam, and a holder for fixedly holding the objective lenses which are tilt-adjusted with respect to the holder, wherein the tilt adjustment device comprises: a holder supporting table for supporting the holder which fixedly holds one objective lens; at least three pins for supporting an inferior surface of an edge of each of other objective lenses by each tip of the pins; a pin fixedly supporting member for fixedly supporting the ends of the pins; tilt adjusting means of the pin fixedly supporting member, which tilts to adjust tilt of each of the other objective lenses around a principal point center with respect to an inferior surface of an edge of the one objective lens; and a press member for pressing a superior surface of each of the other objective lenses, which can be removed after fixing the other objective lenses.

According to the present invention, the holder which constitutes the actuator together with the objective lenses fixedly holds the one objective lens, and the other objective lenses are tilt-adjusted with respect to the holder by the at least three pins and the pin fixedly supporting member so that tilt of the one objective lens can be arbitrarily set. Moreover, the other objective lenses can be fixedly held with respect to the holder, that is, with respect to the one objective lens, at a predetermined tilt. Thus, both objective lenses can be fixedly held with a simple configuration and with high workability.

In the tilt adjustment device for the objective lenses of the present invention, the tilt of the other objective lenses is adjusted with respect to the holder which constitutes the actuator together with the objective lenses, the actuator being provided in the optical pickup device which converges the laser beam emitted from the laser element, irradiates the information recording medium with the converged beam, receives the reflected light from the information recording medium, and reproduces and/or records the information.

The tilt adjustment device for the objective lenses comprises: the holder supporting table for supporting the holder which fixedly holds the one objective lens; the at least three pins for supporting the inferior surface of the edge of each of the other objective lenses by each tip of the pins; the pin fixedly supporting member for fixedly supporting the ends of the pins; the tilt adjusting means of the pin fixedly supporting member, which tilts to adjust the tilt of each of the other objective lenses around the principal point center with respect to the inferior surface of the edge of the one objective lens;

and the press member for pressing the superior surface of each of the other lenses, which can be removed after fixing the other objective lenses.

Among the objective lenses which constitute the actuator together with the holder, the one objective lens is fixedly held with respect to the holder, and the other objective lenses (which can be one or plural objective lenses, besides the one objective lens is only one) are temporarily supported by the after-mentioned three pins and pin fixedly supporting member so that the other objective lenses can be fixedly held after being tilt-adjusted. The other objective lenses are fixedly held after being tilt-adjusted by use of, for example, an adhesive. The adhesive is injected between the other objective lenses and the holder.

In the present invention, to support each of the other objective lenses at a predetermined tilt, the at least three pins for supporting the inferior surface of the edge of each of the other objective lenses by each tip of the pins and the pin fixedly supporting member for fixedly supporting the ends of the pins are employed.

Preferably, each tip of the at least three pins has a hemispherical surface for supporting the other objective lenses. In this case, even when (each tip of) the pins comes into contact with the other objective lenses, only a lifting force is applied to the other objective lenses without adding a biased force or damaging the other objective lenses.

In the present invention, the tilt adjusting means of the pin fixedly support member includes: supporting means for supporting the pin fixedly supporting member to be tiltable; a detector for detecting each reflected light from superior surfaces of the objective lenses; and a tilting mechanism for tilting the pin fixedly supporting member via the supporting means by comparing detection signals obtained by the detector so that the inferior surface of the edge of each of the other objective lenses is tilt-adjusted around the principal point center with respect to the inferior surface of the edge of the one objective lens. Thus, tilt adjustment of the pin fixedly supporting member, that is, tilt adjustment of the other objective lenses by the pins, can be performed automatically and accurately.

In the present invention, the supporting means of the pin fixedly supporting member includes: a fixedly supporting stage having a depression or a projection on its superior surface; and a tilt adjustment base which is slidably supported by the depressed or projected surface of the fixedly supporting stage, and swings the pin fixedly supporting member, so that each of the other objective lenses is tilt-adjusted around the principal point center with respect to the inferior surface of the edge of the one objective lens (the tilt adjustment base has a projection or a depression on its inferior surface in correspondence with the depression or the projection on the superior surface of the fixedly supporting stage). Consequently, the other objective lenses can be stably supported at any angle at the time of the tilt adjustment, and can be easily fixed (by use of the adhesive).

The pins can be removed from the pin fixedly supporting member after the other objective lenses are tilt-adjusted and fixed. Alternatively, the pins and the pin fixedly supporting member may be removed from the holder after the other objective lenses are tilt-adjusted and fixed.

According to another aspect, the present invention provides a method of adjusting tilt of objective lens which are to be provided in an optical pickup device for converging a laser beam emitted from a laser element, irradiating an information recording medium with the converged beam, receiving a reflected light from the information recording medium, and reproducing and/or recording information, the optical pickup device being provided with an actuator comprising a plurality of the objective lenses for converging the laser beam, and a holder for fixedly holding the objective lenses which are tilt-adjusted with respect to the holder. The method includes: a step of supporting the holder which fixedly holds one objective lens; a step of supporting an inferior surface of an edge of each of other objective lenses by each tip of at least three pins, and fixedly supporting the ends of the pins by a pin fixedly supporting member; a step of tilt-adjusting each of the other objective lenses around a principal point center with respect to an inferior surface of an edge of the one objective lens by tilting the pin fixedly supporting member while pressing a superior surface of each of the other objective lenses by a press member; and a step of fixing the other objective lenses to the holder after adjusting the tilt of each of the other objective lenses.

BRIEF DESCRIPTION OF THE DRAWINGS

FIG. 8 is an explanatory view showing a main part of a tilt adjustment configuration of an objective lens fixedly held by a conventional actuator different from that of FIG. 7.

DESCRIPTION OF THE PREFERRED EMBODIMENTS

Embodiments of a tilt adjustment device for objective lenses according to the present invention will be described below with reference to the drawings.

First Embodiment

Figure 1:
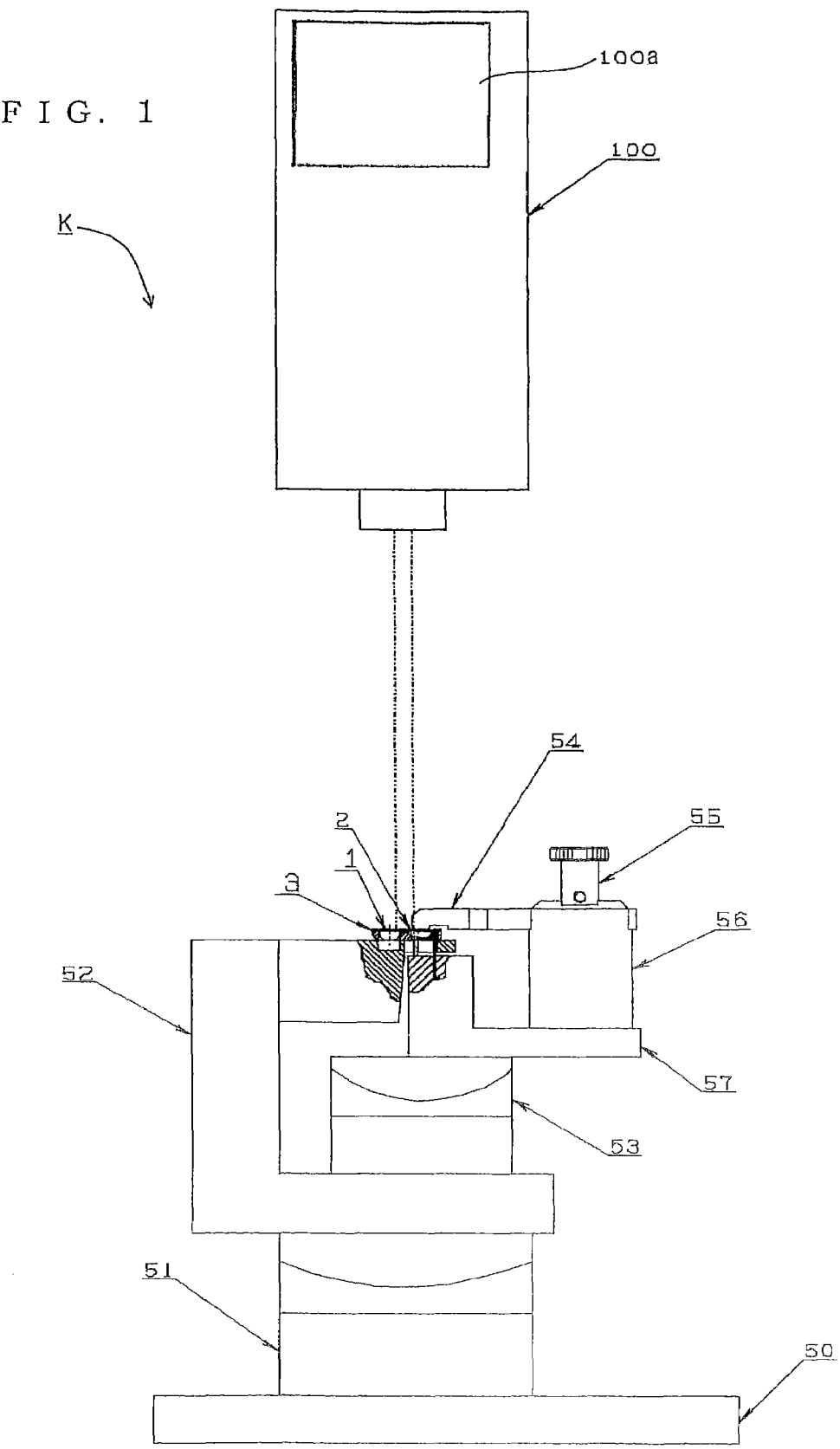
FIG. 1 is a partially-broken side view showing a schematic basic configuration of a first embodiment of a tilt adjustment device for objective lenses according to the present invention.
Figure 2:
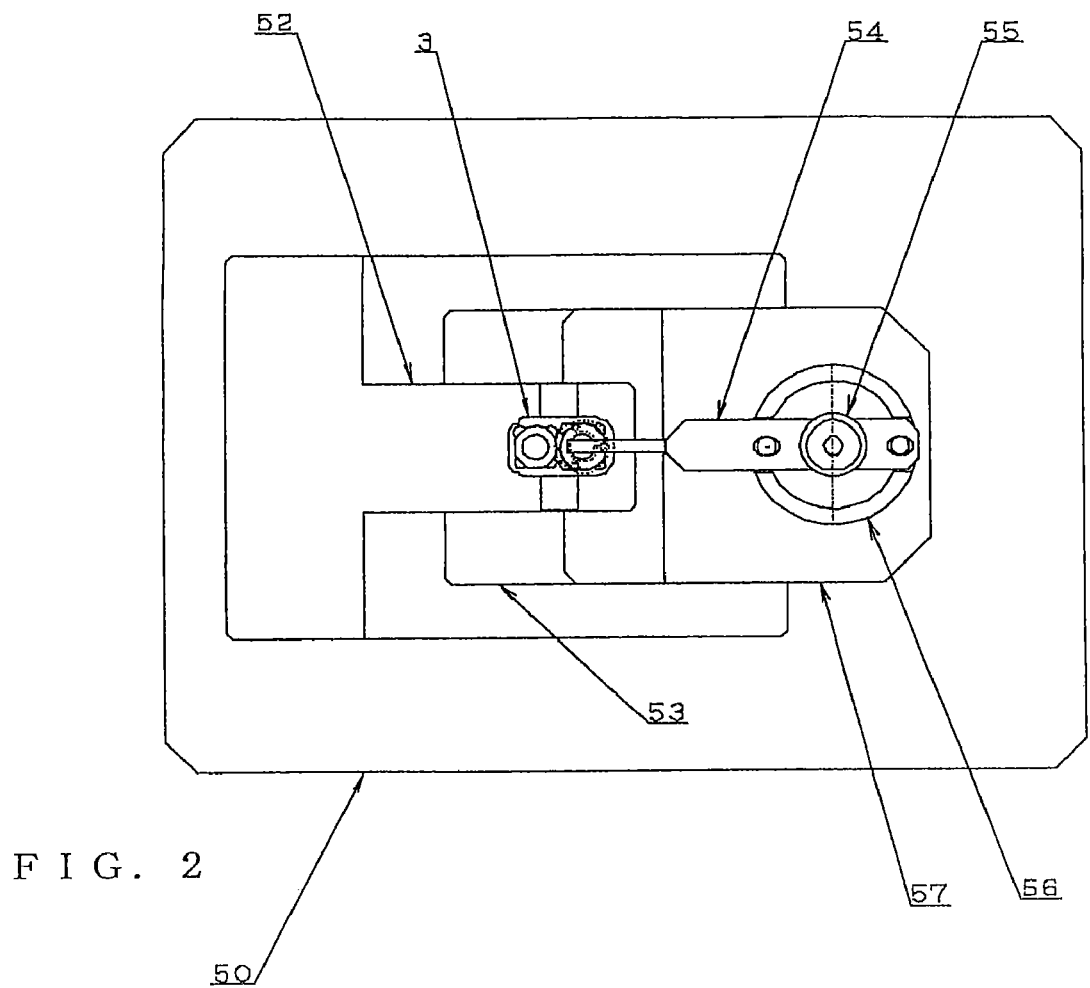
FIG. 2 is a plan view schematically showing the tilt adjustment device of FIG. 1.
Figure 3:
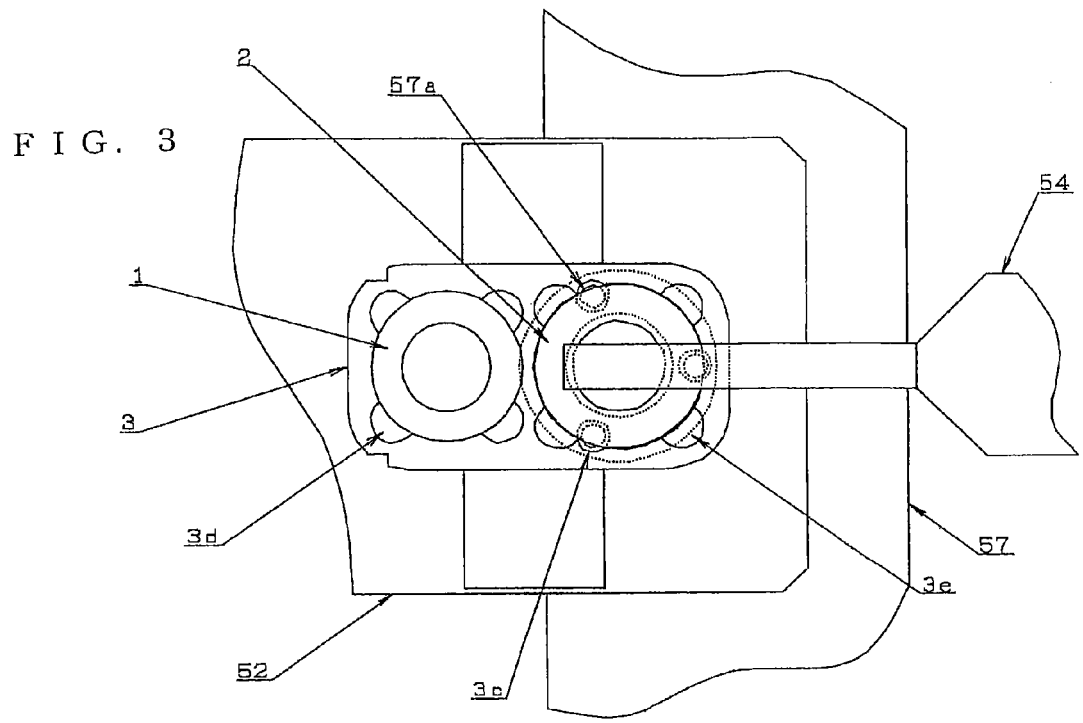
FIG. 3 is an enlarged plan view of a main part of the tilt adjustment device of FIG. 2.
Figure 4:
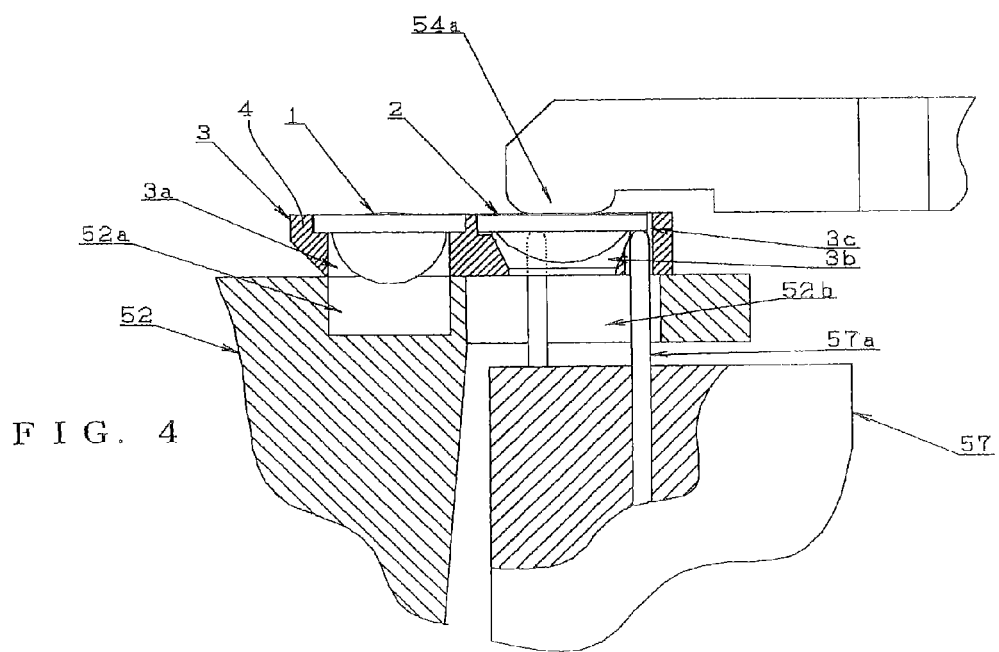
FIG. 4 shows an enlarged longitudinal section of a main part corresponding to FIG. 3.

FIG. 1 is a partially-broken side view showing a schematic basic configuration of a first embodiment of a tilt adjustment device for objective lenses according to the present invention. FIG. 2 is a plan view schematically showing the tilt adjustment device of FIG. 1. FIG. 3 is an enlarged plan view of a main part of the tilt adjustment device of FIG. 2. FIG. 4 shows an enlarged longitudinal section of a main part corresponding to FIG. 3

In FIGS. 1 to 4, a tilt adjustment device K for objective lenses adjusts tilt of the objective lenses which constitute an actuator which is to be provided in an optical pickup device (also simply referred to as "optical pickup"). Here, the actuator has a plurality of objective lenses, that is, a first objective lens 1 and a second objective lens 2, for converging a laser beam and irradiating an information recording medium with the converged laser beam, and a holder (objective lens holder) 3 for holding the objective lenses 1 and 2.

The holder 3 fixedly holds the first objective lens 1 and fixedly holds the second objective lens 2 after the second objective lens 2 is tilt-adjusted.

The tilt adjustment device K for the objective lens comprises: a positioning stand 52 as a holder supporting table for supporting the holder 3 which fixedly holds the first objective lens 1; at least three pins 57a, 57b, and 57c for supporting an inferior surface of an edge of the second objective lens 2 by each tip of the pins; a pin fixedly supporting member 57 for fixedly supporting the ends of the pins; tilt adjusting means for tilting the pin fixedly supporting member 57 so that the second objective lens 2 is tilt-adjusted around a principal point center with respect to an inferior surface of an edge of the first objective lens 1; and a press member 54 for pressing a superior surface of the second objective lens 2, which can be removed after the second objective lens 2 is fixed.

Each tip of the pins 57a, 57b, and 57c has a hemispherical surface for supporting the second objective lens 2. The pins 57a, 57b, and 57c can be removed after the second objective lens 2 is tilt-adjusted and fixed.

The holder 3 has: a lens hole 3a for the first objective lens 1; a lens hole 3b for each second objective lens 2; escape holes 3c for the pins 57a, 57b, and 57c; and adhesive pockets 3d, 3e, ..., which are adjacent to a supporting portion 4 attached to the objective lenses 1 and 2.

The positioning stand 52 has an adjustment hole 52a for the first objective lens 1 so that the positioning stand 52 does not come in contact with the first objective lens 1, and an adjustment hole 52b for the second objective lens 2 so that the positioning stand 52 does not come in contact with the second objective lens 2.

The tilt adjusting means of the pin fixedly supporting member includes: a first adjustment stage 53 for supporting the pin fixedly supporting member 57 to be tilt-adjustable; a tilting mechanism (not shown) such as a handle of a biaxial goniostage of X-axis and Y-axis directions of the first adjustment stage 53 which is capable of finely tilting the pin fixedly supporting member 57 via the first adjustment stage 53; a detector 100 for detecting each reflected light from superior surfaces of the objective lenses 1 and 2; and a monitor 100a which can compare detection signals obtained by the detector 100.

The first adjustment stage 53 and the positioning stand 52 for the first objective lens 1 are supported by a second adjustment stage 51 to be tilt-adjustable. Here, the second adjustment stage 51 is capable of tilt-adjusting the second objective lens 2 by using the biaxial goniostage of the X-axis and Y-axis directions of the first adjustment stage 53.

The reference numeral 55 denotes a rotation knob of the press member 54. After the second objective lens 2 is tilt-adjusted and fixed by being pressed by the press member 54, the press member 54 can be removed from a position on the second objective lens 2 by being rotated. The operation of the tilt adjustment device for the objective lens which is to be provided in the optical pickup device, having the above configuration is as follows.

First, each reflected light from the superior surfaces of the objective lenses 1 and 2 is detected by the detector 100 and displayed on the monitor 100a so as to be compared with each other.

Once the user sees the display on the monitor 100a, he properly operates the tilting mechanism such as the handle of the biaxial goniostage of the X-axis and Y-axis directions of the first adjustment stage 53 to finely tilt the pin fixedly supporting member 57 so that the second objective lens 2 tilts around the principal point center with respect to the inferior surface of the edge of the first objective lens 1. In such a manner, each reflected light from the objective lenses 1 and 2 can be adjusted so as to irradiate an information recording medium 20.

Subsequently, an adhesive is injected into the adhesive pockets 3d, 3e, ... to fix the temporarily held second objective lens 2 to the holder 3. As an example of the adhesive, an ultraviolet curing resin can be used. After the second objective lens 2 is fixed, the press member 54 is removed from the position on the second objective lens 2 by operating the rotation knob 55.

As described above, in the tilt adjustment device K, the first objective lens 1 among the objective lenses 1 and 2 is fixedly held with respect to the holder, and the second objective lens 2 is tilt-adjusted with respect to the holder and by the at least three pins and the pin fixedly supporting member so that the tilt of the first objective lens 1 can be set arbitrarily. Moreover, the second objective lens 2 can be fixedly held with respect to the holder, that is, with respect to the first objective lens 1, at a predetermined tilt. Thus, the objective lenses 1 and 2 can be fixedly held with a simple configuration and with high workability.

The basic configuration of an optical pickup device P of three wavelengths will be described with reference to FIGS. 5 and 6.

Figure 5:
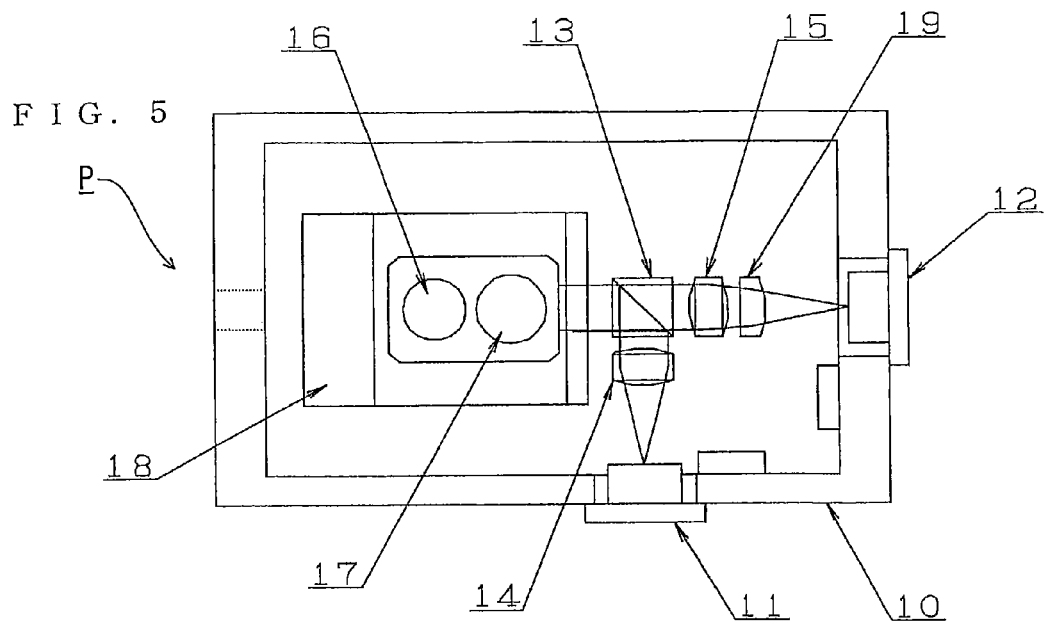
FIG. 5 is a plan view showing a basic configuration of an optical pickup device P of three wavelengths.
Figure 6:
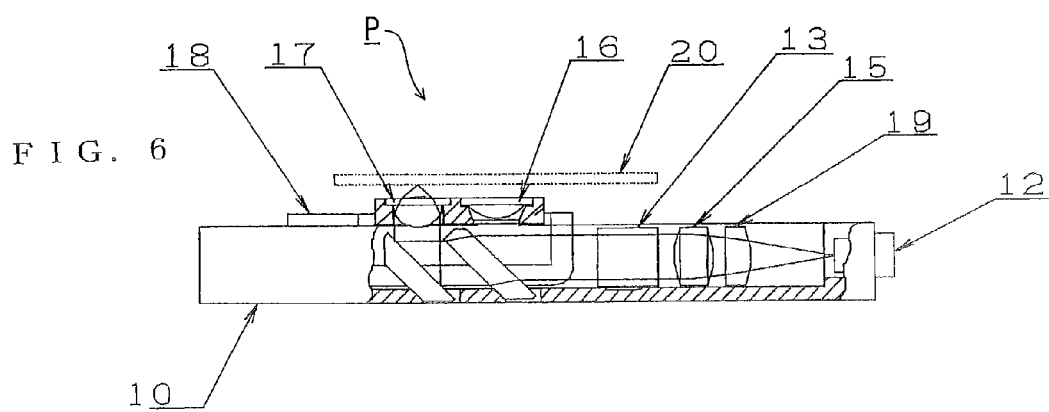
FIG. 6 is a sectional view of the optical pickup device of FIG. 5.
Figure 7:
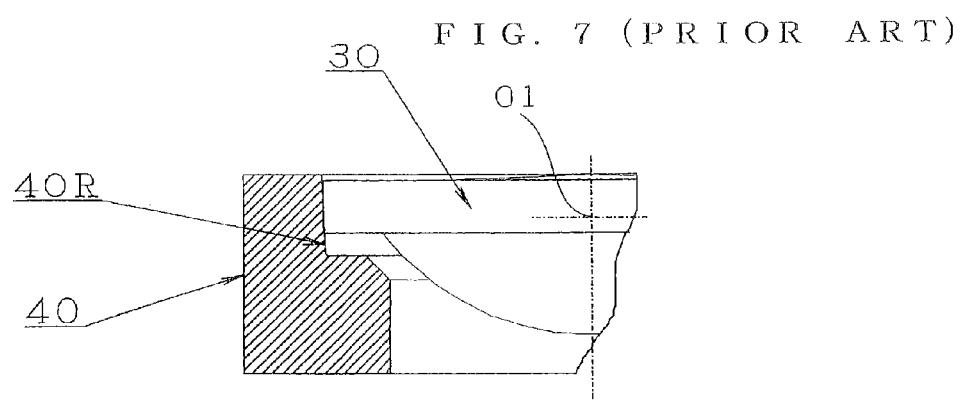
FIG. 7 is an explanatory view showing a main part of a tilt adjustment configuration of an objective lens fixedly held by a conventional actuator.

In FIGS. 5 and 6, light emitted from a semiconductor laser element 11 as a light source A is converted to parallel light by a collimate lens A14. The parallel light is reflected by a dichroic prism 13 and the reflected light as parallel light travels toward objective lenses 16 and 17. The reflected parallel light passes through the objective lenses 16 and 17 and is converted to convergent light. The convergent light is converged on one point on a disk 20 as an information recording medium and is reflected thereby.

On the other hand, light emitted from a semiconductor laser element 12 as a light source B is converted to parallel light by a collimate lens 15 through a cylindrical lens 19. The parallel light passes through the dichroic prism 13 and travels toward the objective lenses 16 and 17 in a state of parallel light. The parallel light which passed through the dichroic prism 13 passes through the objective lenses 16 and 17 similarly to the above reflected parallel light, and is converted to convergent light. The convergent light is converged on one point on the disk 20 as the information recording medium and is reflected thereby.

The reference numeral 10 denotes a housing of the optical pickup device P, and the reference numeral 18 denotes an actuator.

What is claimed is:

1. A tilt adjustment device for objective lenses which are to be provided in an optical pickup device for converging a laser beam emitted from a laser element, irradiating an information recording medium with the converged beam, receiving a reflected light from the information recording medium, and reproducing and/or recording information, the optical pickup device being provided with an actuator comprising a plurality of the objective lenses for converging the laser beam, and a holder for fixedly holding the objective lenses which are tilt-adjusted with respect to the holder, wherein the tilt adjustment device comprises:
 a holder supporting table for supporting the holder which fixedly holds one objective lens;
 at least three pins for supporting an inferior surface of an edge of each of other objective lenses by each tip of the pins;
 a pin fixedly supporting member for fixedly supporting the ends of the pins;

tilt adjusting means of the pin fixedly supporting member, which tilts to adjust tilt of each of the other objective lenses around a principal point center with respect to an inferior surface of an edge of the one objective lens; and a press member for pressing a superior surface of each of the other objective lenses, which can be removed after fixing the other objective lenses to the holder.

2. The tilt adjustment device for the objective lenses according to claim 1, wherein the tilt adjusting means of the pin fixedly supporting member includes:

supporting means for supporting the pin fixedly supporting member to be tiltable;

a detector for detecting each reflected light from superior surfaces of the objective lenses; and a tilting mechanism for tilting the pin fixedly supporting member via the supporting means by comparing detection signals obtained by the detector so that the inferior surface of the edge of each of the other objective lenses is tilt-adjusted around the principal point center with respect to the inferior surface of the edge of the one objective lens.

3. The tilt adjustment device for the objective lenses according to claim 2, wherein the supporting means of the pin fixedly supporting member includes:

a fixedly supporting stage having a depression or a projection on its superior surface; and a tilt adjustment base which is slidably supported by the depressed or projected surface of the fixedly supporting stage, and swings the pin fixedly supporting member, so that each of the other objective lens is tilt-adjusted around the principal point center with respect to the inferior surface of the edge of the one objective lens.

4. The tilt adjustment device for the objective lenses according to any one of claims 1 to 3, wherein after the other objective lenses are tilt-adjusted and fixed to the holder, the pins can be removed from the pin fixedly supporting member.

5. The tilt adjustment device for the objective lenses according to any one of claims 1 to 3, wherein after the other objective lenses are tilt-adjusted and fixed to the holder, the pins and the pin fixedly supporting member can be removed from the tilt adjusting means.

6. The tilt adjustment device for the objective lenses according to any one of claims 1 to 3, wherein each tip of the at least three pins has a hemispherical surface for supporting the other objective lenses.

7. The tilt adjustment device for the objective lenses according to any one of claims 1 to 3, wherein the holder supporting table is provided with a positioning stand which is irradiated with the laser beam passed though each objective lens.

8. The tilt adjustment device for the objective lenses according to any one of claims 1 to 3, wherein the objective lenses are two objective lenses.

9. A method of adjusting tilt of objective lenses which are to be provided in an optical pickup device for converging a laser beam emitted from a laser element, irradiating an information recording medium with the converged beam, receiving a reflected light from the information recording medium, and reproducing and/or recording information, the optical pickup device being provided with an actuator comprising a plurality of the objective lenses for converging the laser beam, and a holder for fixedly holding the objective lenses which are tilt-adjusted with respect to the holder, wherein the method includes:

supporting the holder which fixedly holds one objective lens;

supporting an inferior surface of an edge of each of other objective lenses by each tip of at least three pins, and fixedly supporting the ends of the pins by a pin fixedly supporting member;

tilt-adjusting each of the other objective lenses around a principal point center with respect to an inferior surface of an edge of the one objective lens by tilting the pin fixedly supporting member while pressing a superior surface of each of the other objective lenses by a press member; and fixing the other objective lenses to the holder after adjusting the tilt of the other objective lenses.

10. The method of adjusting the tilt of the objective lenses according to claim 9, wherein the tilt-adjusting of each of the other objective lenses around the principal point center includes:

detecting by a detector each reflected light from superior surfaces of the objective lenses, and comparing detection signals obtained by the detector; and tilting the pin fixedly supporting member by a tilting mechanism so as to tilt-adjust an inferior surface of an edge of each of the other objective lenses around the principal point center with respect to the inferior surface of the edge of the one objective lens while comparing the detection signals.

11. The method of adjusting the tilt of the objective lenses according to claim 9 or 10, wherein the other objective lenses are fixed to the holder by use of an adhesive.

12. An actuator provided in an optical pickup device for converging a laser beam emitted from a laser element, irradiating an information recording medium with the converged beam, receiving a reflected light from the information recording medium, and reproducing and/or recording information, wherein the actuator comprises:

a plurality of objective lenses for converging the laser beam, and a holder for fixedly holding the objective lenses, wherein the objective lenses are tilt-adjusted by the method according to claim 9 or 10 and fixed to the holder.

13. An optical pickup device which is provided with the actuator according to claim 12.

* * * * *